(12) United States Patent
Petela et al.

(10) Patent No.: US 6,343,672 B1
(45) Date of Patent: Feb. 5, 2002

(54) BLOWDOWN AND VENTING JET NOISE SUPPRESSOR

(75) Inventors: Grazyna Petela; Wiktor Jungowski, both of Calgary (CA)

(73) Assignee: NOVA Gas Transmission Ltd., Calgary (CA)

( * ) Notice: Subject to any disclaimer, the term of this patent is extended or adjusted under 35 U.S.C. 154(b) by 0 days.

(21) Appl. No.: 09/532,438

(22) Filed: Mar. 23, 2000

(51) Int. Cl.[7] .................................................. E04F 17/04
(52) U.S. Cl. ....................................... 181/224; 181/210
(58) Field of Search ................................ 181/210, 248, 181/252, 258, 279, 282

(56) References Cited

U.S. PATENT DOCUMENTS

| | | |
|---|---|---|
| 1,425,637 A | 8/1922 | Eschholz |
| 1,666,257 A | 4/1928 | Furnivall |
| 3,889,776 A | 6/1975 | Postma |
| 4,953,659 A | 9/1990 | Norris |
| 5,036,948 A | 8/1991 | Henn |
| 5,166,479 A * | 11/1992 | Gras et al. .................. 181/256 |
| 5,266,754 A | 11/1993 | Swift |
| 5,962,822 A * | 10/1999 | May ........................... 181/264 |
| 6,202,785 B1 * | 3/2000 | Hilling et al. .............. 181/230 |
| 6,161,646 A * | 12/2000 | Curl ............................ 181/252 |

* cited by examiner

Primary Examiner—Robert E. Nappi
Assistant Examiner—Kim Lockett
(74) Attorney, Agent, or Firm—Bereskin & Parr

(57) ABSTRACT

The present invention relates to a noise suppressor capable of reducing the noise of a fluid vented at high pressure and high mass flow rate from an industrial source, to the environmentally acceptable noise level. The invention combines two principles of dissipation of fluid stream energy: first, stream pressure is reduced by passing the stream through a swirler to split the stream into a number of smaller tangential streams which dissipate their energy along the spiral flow path due to friction; and next, the resulting streams pass through a tightly packed granular bed to reduce further the pressure and velocity of the exiting jet to atmospheric pressure and subsonic velocity, respectively. Such jet will generate much lower noise level, as compared to high pressure jet with cellular structure and supersonic velocity.

25 Claims, 3 Drawing Sheets

BLOWDOWN AND VENTING JET NOISE SUPPRESSOR

FIELD OF THE INVENTION

The present invention relates to a device that reduces noise arising from venting at high pressure of a high mass flow rate stream of fluid, to an environmentally acceptable level, and releases the resulting jet at subsonic velocity. In a number of industries, high pressure fluid systems, typically gaseous, need to be vented. There are a number of constraints on such systems. In an emergency situation (e.g. fire at a compressor station for a pipeline) the fluid venting time must be very short. Additionally, the noise of the venting jet has to be reduced to the level that complies with environmental noise control standards.

BACKGROUND OF THE INVENTION

Many industrial processes require the release of high pressure fluid, such as gas, into the atmosphere. This type of release may occur through, for example, stacks or vents equipped with safety or relief valves which are installed in compressor stations, gas metering stations, cryogenic facilities and power plants. Typically, without any additional noise suppression devices, such releases will result in a supersonic or sonic jet causing significant noise pollution. Generally, in industrial facilities, such a jet will have a noise level of at least about 120 decibels (dB), measured at app. 50 m from the source, similar to the noise of a jet engine. There are a number of laws and regulations to protect workers and the general public against noise pollution. Therefore, there is an increasing need for effective and inexpensive silencers for jet noise, in particular, for high flow rate releases from high pressure fluid facilities.

A need clearly exists for a device inhibiting excessive noise generation (i.e. a device which reduces the amount of noise generated to the acceptable level but does not necessarily prevent all noise). Such device should be effective, simple to construct, robust, and of a relatively compact size so that it may be transported, or even constructed as a portable one, (e.g. for the blowdown of a pipeline for routine maintenance).

Generally, mechanical silencers or mufflers seek to throttle the exhaust fluid jet to reduce jet pressure and velocity. This can be accomplished when the jet is passed through a porous packing such as sinter or sponge, as disclosed in U.S. Pat. No. 5,036,948, issued August 1993, U.S. Pat. No. 1,425,637 issued April 1890, U.S. Pat. No. 1,666,257 issued Apr. 17, 1928 and U.S. Pat. No. 4,953,659 issued Sep. 4, 1990. However the porous materials used in the above inventions are suitable for low mass flow rates of the attenuated fluid. Based on similar principle is the concept of flow through metal discs with expanding passage grooves, which is utilized in the commercially available "atmospheric resistors", sold by Control Components Inc. of California, U.S.A. However, in this case, the fabrication of the disks is very expensive and the disk stacks are large and very heavy. These limitations are avoided by the hemispherical "excessive noise preventer", in which fluid is throttled by a granular layer of spherical particles, as disclosed in Canadian Patent Application 2,082,988.

The alternative approach is to pass the fluid through one or more perforated plates as illustrated by U.S. Pat. No. 5,266,754 issued Nov. 30, 1993 and U.S. Pat. No. 3,889,776 issued Jun. 17, 1975. This approach seeks to also break up the stream into a number of smaller streams, but the perforated plates are not sufficiently effective in noise suppression. The mufflers which utilize a combination of the perforated plates and sound attenuating lining, are also commercially available from e.g. American Air Filters and Acoustic Lining Co., but these devices have extremely large dimensions and are very expensive.

None of the art teaches or suggests the use of "swirler" to break up the stream and concurrently direct a number of streams in radial and tangential directions along an energy adsorbing surface and then subsequently through a tightly packed layer of granular material.

The present invention seeks to provide a rugged and simple jet noise inhibition device which may be used with jets vented at high flow rate from a high pressure fluid facility.

SUMMARY OF THE INVENTION

The present invention provides a fluid jet pressure and velocity reducing and noise suppressing device, comprising in cooperating arrangement, an inlet, an annular base, an annular cylindrical dissipative swirling member, a dissipative annular shroud member and a diffuser. The inlet is adapted to cooperate with and receive a fluid stream from a stack of a high pressure system. There is an annular base for receiving the inlet.

The annular cylindrical dissipative swirling member, has an internal diameter at least equal to or larger than the diameter of the inlet and an external diameter less than the diameter of the base. The swirling member comprises an annular array of enclosed radially outwardly extending swirling channels, wherein the sum of the minimum cross section areas of the channels is not less than the cross section area of the inlet. The channels have walls defined by a set of vanes mounted on the base around the inlet, to deflect, swirl and discharge the fluid stream in a radially outward and tangential manner.

The dissipative annular shroud member comprises: (i) a housing mounted on the base, having an internal diameter larger than the external diameter of the swirling member and (ii) an inner core mounted on the top of the annular dissipative swirling member, the inner core comprising a first part in the form of a cylindrical segment with a diameter substantially the same as the external diameter of the annular dissipative swirling member, and a second part in the form of a conical segment having a diameter at its base substantially equal to the diameter of the cylindrical segment.

The diffuser is mounted upon the housing and has an opening at its lower end at least as large as the diameter of the external housing and has one or more outwardly sloping walls defining a final opening of a size so that the pressure of the fluid jet at the exit of the diffuser is atmospheric and the velocity of the fluid jet is subsonic. The diffuser is tightly packed with discrete particulate packing and the diffuser has first and second grates to retain the particulate packing in the diffuser.

The present invention also provides a process to vent a fluid under pressure up to 15,000 kPa, to atmospheric pressure at a subsonic velocity within a period of time adequate for an emergency shut down of the high pressure fluid system, which comprises passing said one or more jets of said fluid through one or more devices as described above.

Further, the present invention provides a process to reduce the pressure and velocity of a sonic or super sonic fluid jet. The process comprises dividing the inlet stream into a plurality of streams and deflecting the resulting streams into contact with one or more high friction surfaces to dissipate the energy of the resulting streams and passing the resulting streams through a layer of granular packing having an increasing cross section area in the direction of flow to reduce further the resulting exiting jet to subsonic flow conditions.

DETAILED DESCRIPTION OF THE DRAWINGS

The term suppressor is used in the specification and claims to describe a device which reduces noise levels in a venting jet of fluid from the noise level that would be experienced if the device were not used. The term suppression does not mean the noise level is reduced to any particular decibel level.

The suppressor of the present invention is useful in association with the high pressure, high flow rate discharge of a supersonic or sonic fluid, generally gaseous, jet. Generally, the jet may be released at flow rates up to 600 kg/sec from facilities with fluid pressure up to 15,000kPa (about 2,175 psi). Although the suppressor may be used for other applications it is particularly useful in a pipeline environment and in particular a natural gas (methane) pipeline.

In the device of the present invention noise suppression is based on the two equally important principles: firstly, to reduce stream pressure by restructuring stream aerodynamics into a swirl and to dissipate its energy along the spiral flow path due to friction, and secondly, to reduce the stream velocity by forcing the swirled flow through a layer of granular material.

This process of pressure and velocity reduction occurs in the noise suppressor of the present invention, which consists of the following parts: the swirler, which restructures the stream into a number of swirling streams; the annular shroud, preferably having the inner walls adapted to increase friction and to dissipate energy of the swirled stream: and the exit diffuser which contains, between its perforated bottom and top grates, a layer of tightly packed granular material which creates a tortuous path for the flowing swirled stream and reduces further the exiting jet pressure to an ambient level and jet velocity to a subsonic level at the diffuser outlet.

One embodiment of a noise suppressor in accordance with the present invention will now be described in conjunction with FIG. 1.

Figure 1:
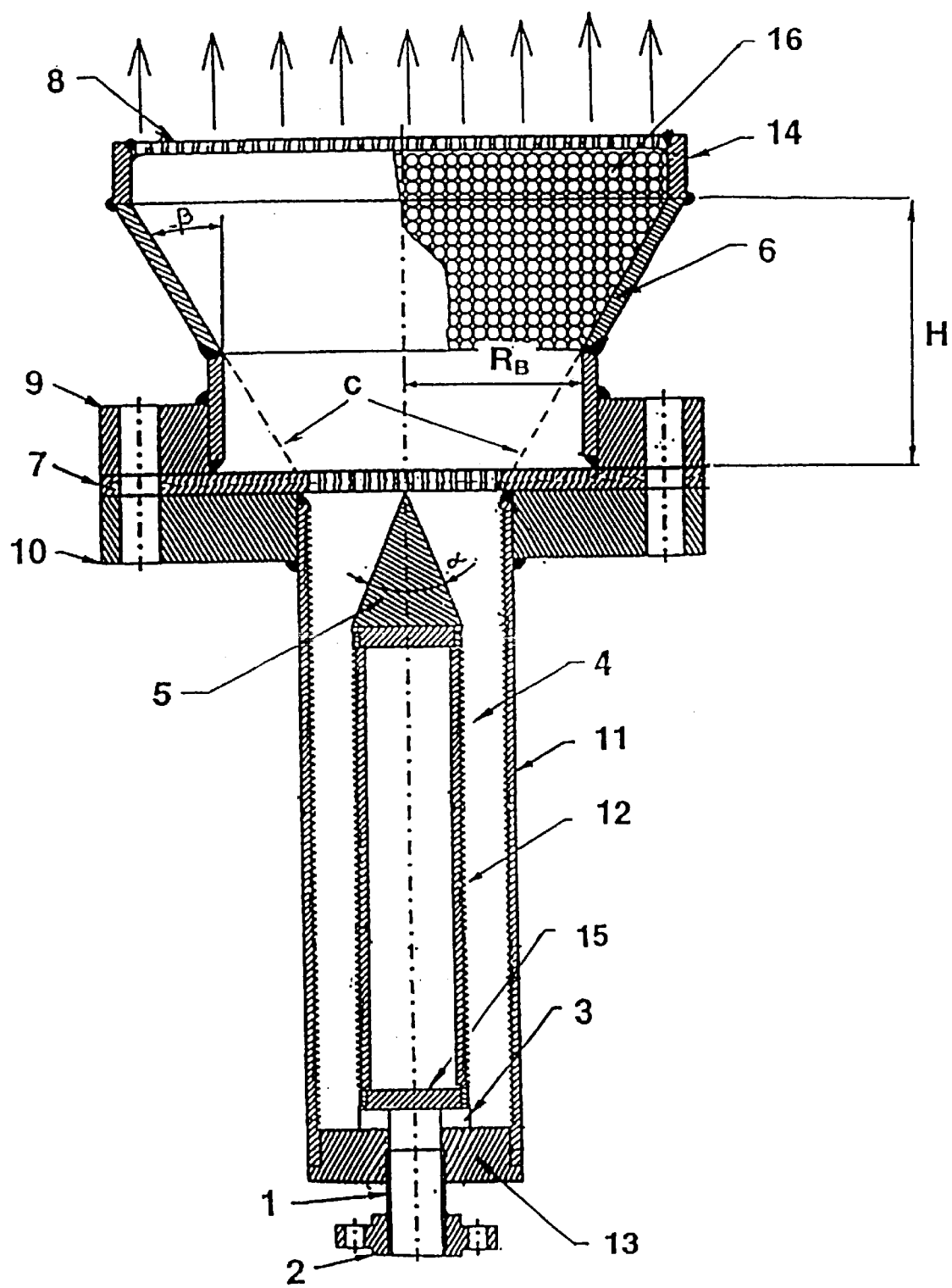
FIG. 1 is a schematic sectional view of a preferred embodiment of a noise inhibiting device in accordance with the present invention.

The noise suppressor of FIG. 1 comprises the following elements. The noise suppressor is mounted on a vent from a high pressure vessel or line (not shown in the drawing), using a flange member 2. The flange member is annular in shape having an internal opening of a size to accommodate the inlet 1, which is a pipe segment. Flange member 2 is adapted to cooperate with a corresponding flange member at or adjacent to, the exit of the stack (not shown). While a flange member 2 is shown in the drawing, other means for attaching the noise suppressor to the stack could be used. For example the inlet 1 could fit snugly either over or in the vent, or the inlet could be welded to the vent. A number of other mechanical equivalents will be obvious to those of skill in the art. The inner diameter of the inlet 1, is not smaller than that of the stack or vent from the high pressure fluid system.

Figure 2:
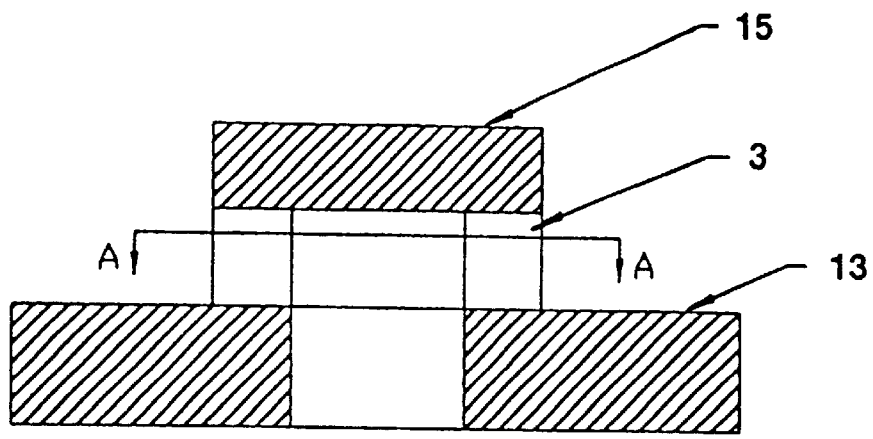
FIG. 2 is a side view of a swirler which is part of the device shown in FIG. 1.
Figure 3:
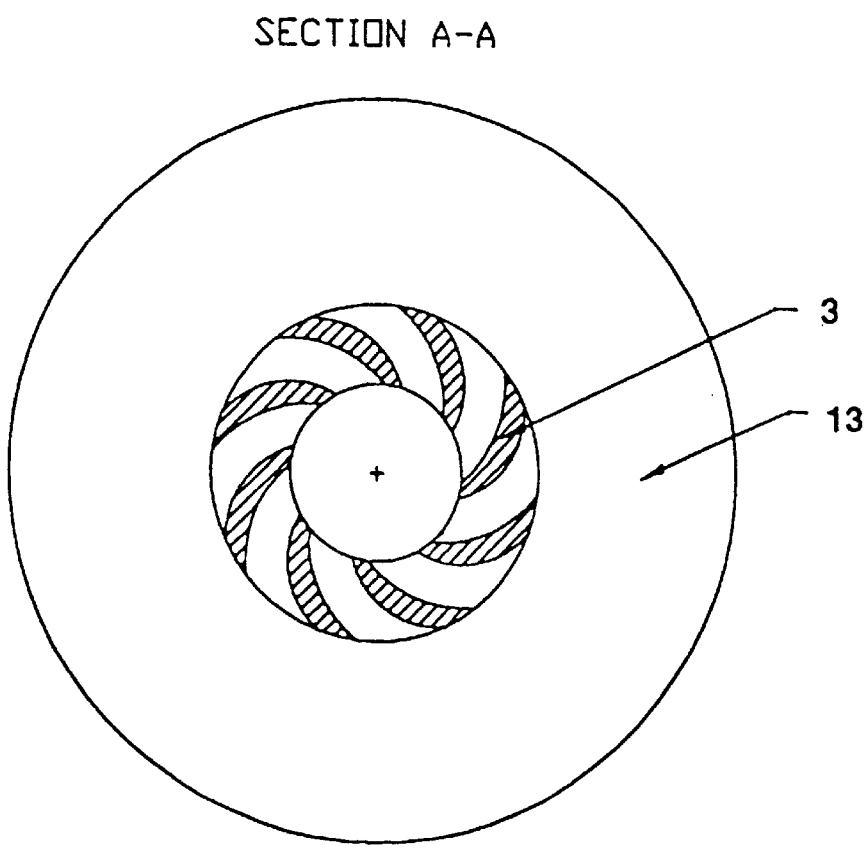
FIG. 3 is a sectional top view through A—A of the swirler of FIG. 2.

The inlet 1 passes into or through the annular base 13 of the suppressor. The inlet 1 opens into a swirler 3 in the interior of the suppressor, in accordance with the present invention. The swirler has an internal diameter equal to the external diameter of the inlet 1 and an external diameter less than the diameter of the annular base 13. The swirler comprises an annular array of enclosed radially outwardly extending swirling channels. The sum of the minimum cross section areas of the channels is not less than the cross section area of the inlet. The channels have walls defined by a set of vanes mounted on the inner surface of said annular base around the inlet, to deflect, swirl and discharge the fluid stream into a radially outward flow. Preferably the vanes are uniformly spaced in a radial manner around the inlet. The swirler 3 may be fabricated in any number of ways. It could be formed by attaching a number of vanes to the base 13 or it could be formed by casting, milling or welding vanes, to provide the enclosed channels. That is the channels have a base, which may be the inner surface of the base 13 or a part of a molded, milled or welded component walls which are the vanes, and a closed cover which defines one surface of the channel. The cover may be an integral part of the swirler (e.g. cast or machined or a welded part) or it may be attached to or dependent from the base of the inner core 12. The vanes may be straight or curved or may be in the form of wedges. The vanes must be such that the channels deflect the resulting streams in a radially outward manner having a tangential component relative to the swirler. Most preferably, the vanes have a deflective tangential angle greater than 5°, typically from 5° to 25°, as measured from a radius of the base. The channels preferably deflect the stream in a right angle from the inlet direction but they might be inclined at an angle of up to 15° up from the base. One of the possible means to construct the swirler is shown in FIGS. 2 and 3, where the swirler is cast with the annular base 13, vanes 3, and the cover 15 as integral parts.

The streams from the swirler are discharged into a dissipative annular shroud member generally indicated as 4. The annular dissipative shroud member comprises a cylindrical housing 11, having an internal diameter essentially the same as the outer diameter of the base 13, and an inner core having a first part in the form of a cylindrical segment 12 and a second part in the form of a conical segment 5. The cylindrical housing 11 may be attached to the annular base 13 by a number of means. For example, the base could have external threads and the cylindrical housing could have internal threads to engage the annular base. The swirler 3 could be welded or riveted or bolted, or even be an integral part of the annular base 13, as is shown in FIG. 2. The cylindrical segment 12 of the inner core may be mounted on the swirler, if the swirler is a unit construction or mounted directly on top of the vanes. The cylindrical segment may be attached to the vanes of the swirler by any conventional fixing means (e.g. welded, bolts or riveted etc.). The second conical segment 5 may be an integral part of the inner core or may be a separate part attached onto the cylindrical segment 12. The base of the conical segment 5 has a diameter the same as the diameter of the cylindrical segment 12. The angle a of the surface of the conical segment is generally less than 90°, typically from 30 to 60°. In the preferred embodiment of the invention, the internal surface of the cylindrical housing 11, and/or the external surface of the inner core (either or both of the cylindrical segment 12 and conical segment 5), may be threaded to provide an increased friction surface that the stream has to pass over. The threads, if present, may have a depth from 5–8 mm.

The downstream end of the shroud inner core, shaped in the form of a conical segment 5, ensures gradual expansion of the shroud cross section area from the annular shape to the full circle. The geometry of the conical segment, characterize by the angle α, which preferably should not be larger than 45°, ensures a smooth flow transition between the annular and circular passage areas. Larger α angles may create flow disturbance and separation of the swirled stream from the cone wall at the shroud exit.

The major function of the dissipative shroud 4 is to dissipate jet energy and to promote a large pressure drop. This is achieved by increasing friction along the threaded shroud walls, and by lengthening the flow path with the swirling motion of the stream.

In the embodiment shown in FIG. 1 there is a flange 10 mounted externally at the upper end of the dissipative shroud member. The flange is illustrative of one of the means to mount and attach the diffuser 6 on top of the dissipative shroud member. The diffuser 6 could be attached to the upper end of the dissipative shroud member by a number of mechanical equivalents such as by welding, bolts or rivets.

The diffuser comprises an inverted truncated cone 6. The angle of the wall of the truncated cone relative to the axis of the cone may be from 10° to 50°. Other shapes, for example square, could also be used for the diffuser. In the FIG. 1 the base of the inverted truncated cone is attached to a flange 9. The flange 9 attaches to flange 10 at the upper end of the annular dissipative shroud. In FIG. 1, the cone walls of the diffuser 6 do not project to the exit of the annular dissipative shroud. However, this was done only for ease of fabrication and it represents an optional feature, because the truncated diffuser cone 6 could extend to the outlet of the dissipative shroud member.

In accordance with the invention there are grates adjacent the inlet and adjacent the exit of the diffuser 6, to provide openings for fluid flow and to contain packing. In the embodiment shown in FIG. 1 there is the plate 7 having a first grate therein. The grate contains the granular material and provides an opening for the fluid flow from the dissipative annular shroud member. In FIG. 1 the plate 7 is held in place by the diffuser flange 9 and the dissipative shroud flange 10. At the upper end of the inverted truncated cone diffuser (as shown in FIG. 1) is a rim 14. On the top of rim 14 is a second grate 8. In the FIG. 1, the second grate was welded on to the rim. The rim was used to provide for ease of welding the grate to the diffuser and it represents an optional feature, because the grate 8 could be fixed directly to the top of the diffuser. The diffuser is tightly packed with granular packing 16. The size of the perforations in both grates should be sufficiently large to provide no flow restriction for the. stream, but also sufficiently small to contain the smallest pieces of the granular packing. The granular packing or particulates 16 may be of regular shape such as spheres as shown in the drawing. While spheres are shown, other regular shapes could be used. The granular packing could be irregularly shaped. Gravel provides cheap granular packing.

The granular packing in the diffuser creates the tortuous path for the flow of the stream, which results in a further pressure and velocity reduction of the fluid. The achieved reduction depends on the thickness of the granular layer and on the angle α of the wall of the conical diffuser. The diameter or size of the opening at the exit of the diffuser is such that at the exit there is no substantial constraint on the flow of the fluid out of the suppressor and the velocity of fluid is substantially reduced, preferably to subsonic velocity. The depth of packing to obtain a desired pressure drop to substantially atmospheric pressure may be calculated based on principles for fluid (gas) flow through a tightly packed granular bed. Once the bed depth is determined and the size of the exit from the diffuser is calculated, the angle of the wall of the diffuser may be determined as a function of the exit opening and the bed depth.

The operation of the suppressor will now be described.

A high pressure fluid (gaseous) stream enters the inlet of the suppressor, and flows into the swirler. The fluid is there divided among the swirler channels into the smaller streams, which are discharged radially outwardly from the channel exits into the dissipative shroud, at tangential directions consistent with the shape of the swirling vanes.

The swirling streams, after impinging and mixing at the bottom of the shroud, flow upwards as shown in FIG. 1, through the annular cross section of the shroud. The increased flow path, due to a swirling motion of the stream and the increased friction along the threaded walls of the shroud, results in substantial pressure losses.

The stream exits the shroud and enters the diffuser through the first perforated grate. It flows through the increasingly large cross section of the granular bed, which creates the tortuous path for the flow. As a result, the stream is throttled and dissipated into even smaller streams, which are of lower turbulence, lower velocity, and they experience further pressure losses combined with the simultaneous velocity reduction. The jet flow exits the diffuser through the second perforated grate, at atmospheric pressure and with a subsonic velocity. Accordingly, noise generated by the jet is significantly reduced.

EXAMPLE

The present invention will now be illustrated by the following non-limiting example.

A prototype according to the present invention was constructed and installed on a 2" vent stack at a natural gas compressor station, in order to reduce the level of the venting noise. The jet noise suppressor was similar to the one shown in FIG. 1, with the dimensions given below.

(a) The inlet was a segment of 2" pipe, having an inner diameter of about 52.5 mm.

(b) The swirler was a fabricated part (cast) and had the following dimensions: the annular base diameter of the prototype was 200 mm; the outer diameter of the swirling vanes was 100 mm; the diameter of the first plate was 100 mm; and the height of the swirling vanes was 21 mm.

(c) The dissipative shroud was made of an NPS-8/schedule-80 pipe segment, with the inner diameter of 194 mm; the inner core of the shroud was made of NPS-4 pipe having an outer diameter of 100 mm. The interior walls of the shroud were threaded approximately 5 mm deep. The conical segment of the inner core had a cone angle a of 45° and a height of 120 mm.

(d) The conical diffuser had a granular bed height of 300 mm and the angle α was 30°. The cylindrical diffuser base had diameter of 362 mm, to accommodate the shape of the conical diffuser shown with the dotted line "c" in FIG. 1, and to ease manufacturing. The height of the diffuser rim was 50 mm.

(e) The perforated grates that constituted first and second grills of the diffuser, had a multiplicity of 4 mm in diameter holes with staggered centers. The thickness of the first plate was approximately 25 mm, while the thickness of the second plate was approximately 12.7 mm.

(f) The conical diffuser of the suppressor was filled with satellite shaped (i.e. a cylindrical middle and two hemispherical ends) alumina granules.

Natural gas at a mass flow rate of 16.0 kg/s, at stagnation pressure of approximately 6000 kPa and a temperature 10° C., was vented through the above described suppressor.

The testing was carried out with two sizes of granular fillings. The first filling was of uniform granules having an average diameter of 9 mm. The second filling contained a mixture of approximately equal amounts of granules having an average diameter of 6 mm and 9 mm.

Figure 4:
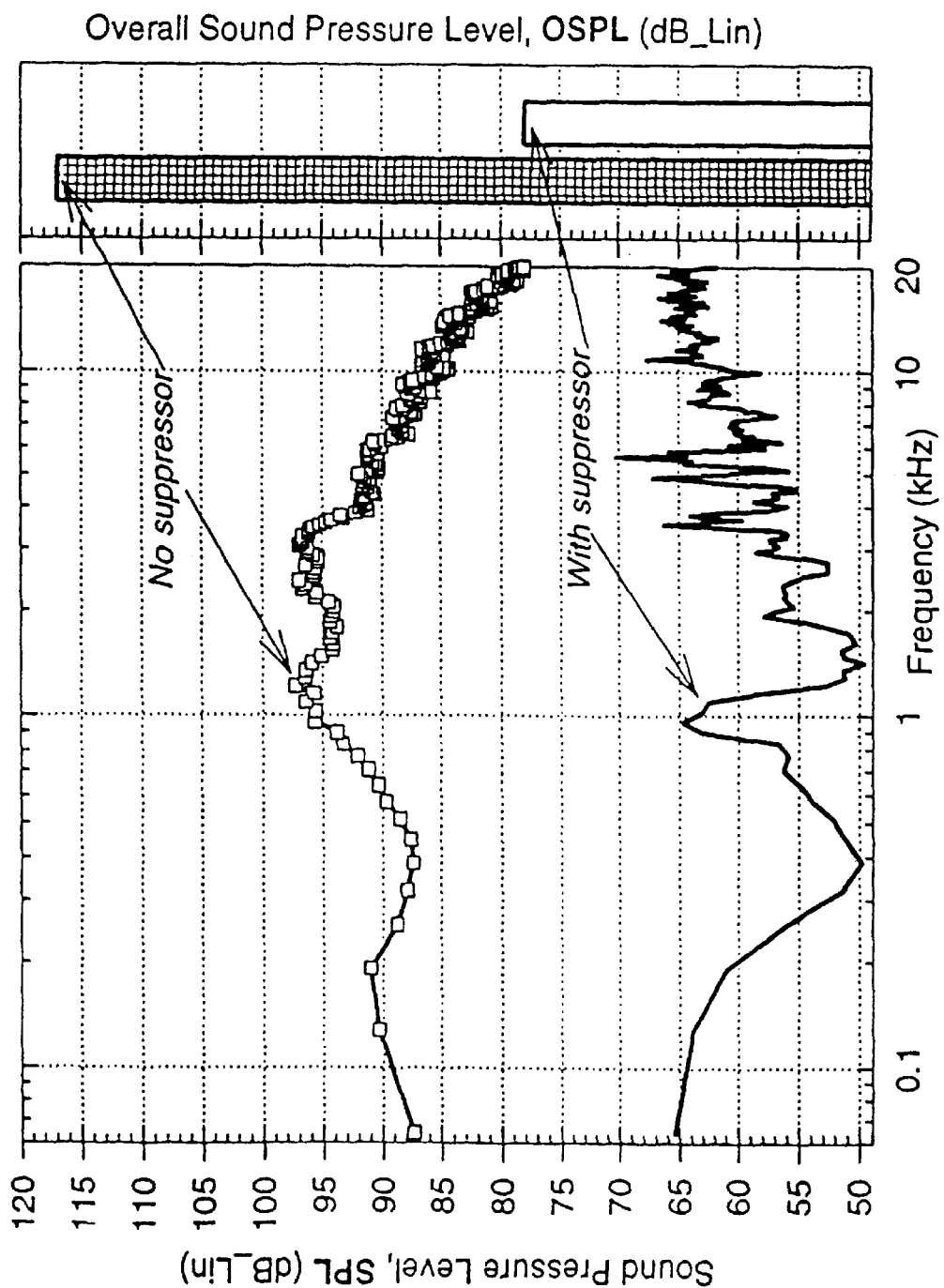
FIG. 4 shows the results of the performance testing of the device of FIG. 1 and compares noise spectra and overall noise levels generated by a free unsilenced jet exiting the stack in the absence of the suppressor, with the noise generated by the jet exiting the suppressor installed on the 2" stack.

The noise level generated by the venting was significantly reduced by the device in comparison to the free venting in the absence of the noise suppressor. The suppressor containing the mixture of two sizes of granular filling in the diffuser provided noise attenuation from overall sound pressure level (OSPL) of 118 dB, measured at 45 m, by more than 40 dB, to almost background noise, as shown in FIG. 4. This result was approximately 3 dB better than the noise attenuation obtained with the suppressor with uniform larger filling. The levels (SPL) of all noise components in the spectrum were significantly suppressed, what indicates effective suppressor performance in the entire frequency range, up to 20 kHz.

We claim:

1. A fluid stream pressure and velocity reducing and noise suppressing device comprising in cooperating arrangement:

A. an inlet adapted to cooperate with and receive a fluid stream from a stack of a high pressure system;

B. an annular base for receiving said inlet;

C. an annular cylindrical dissipative swirling member having an internal diameter at least equal to or larger than the diameter of said inlet and an external diameter, said swirling member comprising an annular array of enclosed radially outwardly extending swirling channels, wherein the sum of the minimum cross section areas of said channels is not less than the cross section area of the inlet, said channels having walls defined by a set of vanes mounted on said base around said inlet, to deflect, swirl and discharge said fluid stream in a radially outward and tangential manner;

D. a dissipative annular shroud member comprising:
  (i) a housing mounted on said annular base, having an internal diameter larger than said external diameter of said swirling member;
  (ii) an inner core mounted on the top of said annular dissipative swirling member, said inner core comprising a first part in the form of a cylindrical segment with a diameter substantially the same as said external diameter of said annular dissipative swirling member, and a second part in the form of a conical segment having a diameter at its base substantially equal to the diameter of said cylindrical segment; and E. a diffuser being mounted upon said housing and having an opening at its lower end at least as large as the internal diameter of said housing and having one or more outwardly sloping walls, said diffuser defining a final opening of a size so that the pressure of the fluid stream at the exit of said diffuser is atmospheric and the velocity of the fluid jet is subsonic, said diffuser being tightly packed with discrete particulate packing and said diffuser having first and second grates to retain said particulate packing in said diffuser.

2. The device according to claim 1, wherein said diffuser is tightly packed with regularly shaped particles.

3. The device according to claim 2 wherein said diffuser is tightly packed with spherical particles.

4. The device according to claim 1 wherein said diffuser is tightly packed with irregular particulate packing.

5. The device according to claim 4 wherein said diffuser is tightly packed with gravel.

6. The device according to claim 1, wherein the angle α of the walls of said diffuser is from 10° to 50°.

7. The device according to claim 6, wherein said diffuser is a truncated cone.

8. The device according to claim 1, wherein in said annular dissipative swirling member said vanes are uniformly radially spaced.

9. The device according to claim 8, wherein said vanes have a tangential deflective angle greater than 5°.

10. The device according to claim 9, wherein said vanes have straight parallel deflective edges.

11. The device according to claim 9 wherein said vanes are wedged shaped.

12. The device according to claim 9, wherein said vanes are curved.

13. The device according to claim 1, wherein said internal surface of said housing has threads having a depth from 5 to 8 mm.

14. The device according to claim 1, wherein said external surface of the inner core member has threads having a depth from 5 to 8 mm.

15. The device according to claim 13, wherein the external surface of the inner core member has threads having a depth from 5 to 8 mm.

16. The device according to claim 1 wherein at least one of said first and second grates on said diffuser is removable.

17. A process to vent a fluid under pressure up to 15,000 kPa to atmospheric pressure at a subsonic velocity within a period of time adequate for an emergency shut down of the high pressure fluid, which comprises passing said one or more streams of said fluid through one or more e devices according to claim 1.

18. A process according to claim 17 wherein said time is less than 5 minutes.

19. A process to vent a fluid from a system under pressure up to 15,000 kPa, to atmospheric pressure at a subsonic velocity within a period of time adequate for a planned shut down of the high pressure fluid system, which comprises passing said one or more streams of said fluid through one or more devices according to claim 1.

20. The process according to claim 17 wherein said fluid under high pressure is in a pipeline.

21. The process according to claim 18 wherein said fluid under high pressure is in a pipeline.

22. The process according to claim 19 wherein said fluid under high pressure is in a pipeline.

23. The process according to claim 20 wherein said fluid is natural gas.

24. The process according to claim 21 wherein said fluid is natural gas.

25. The process according to claim 22 wherein said fluid is natural gas.

* * * * *